Nov. 19, 1929.　　　F. M. FURBER　　　1,735,898
DRIVING AND CONTROLLING MECHANISM
Filed Aug. 16, 1926　　　2 Sheets-Sheet 1
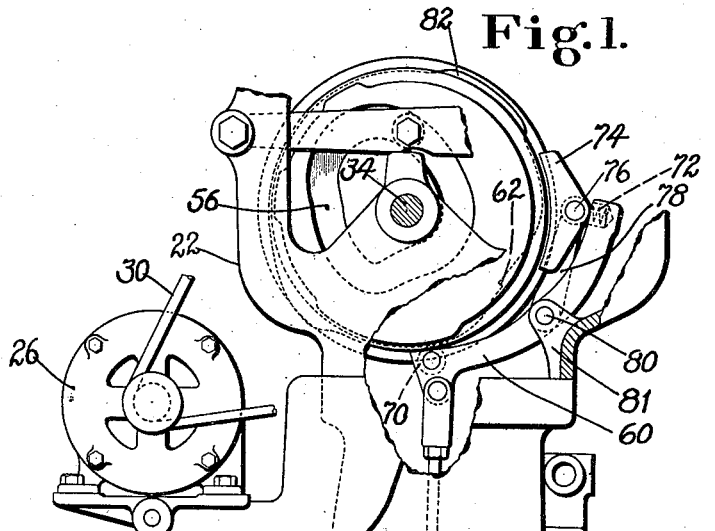
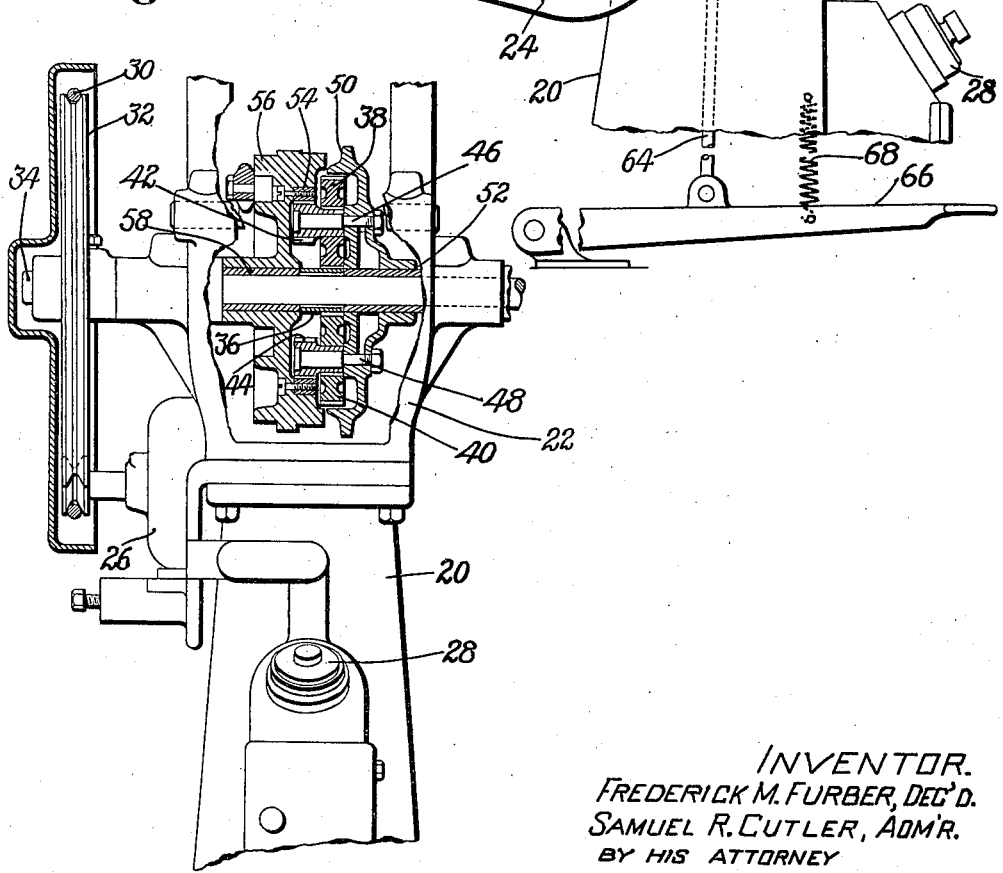
INVENTOR.
FREDERICK M. FURBER, DEC'D.
SAMUEL R. CUTLER, ADM'R.
BY HIS ATTORNEY
Nelson M Howard

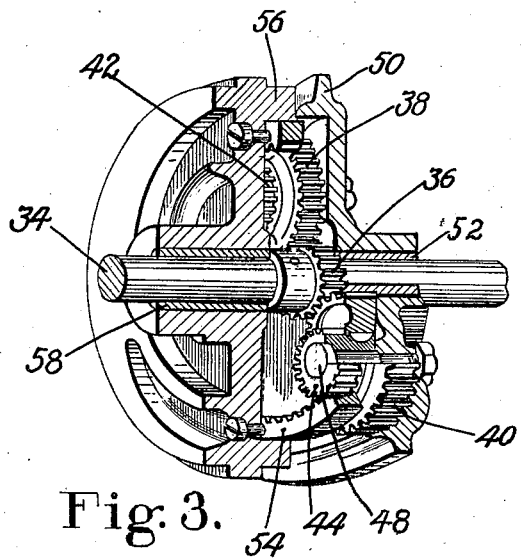
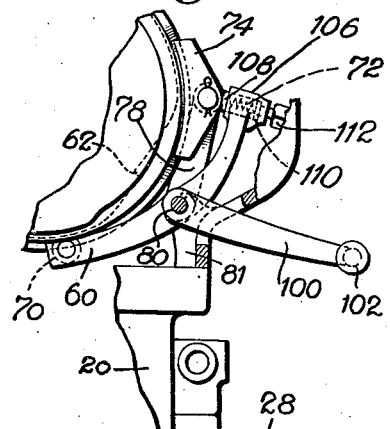
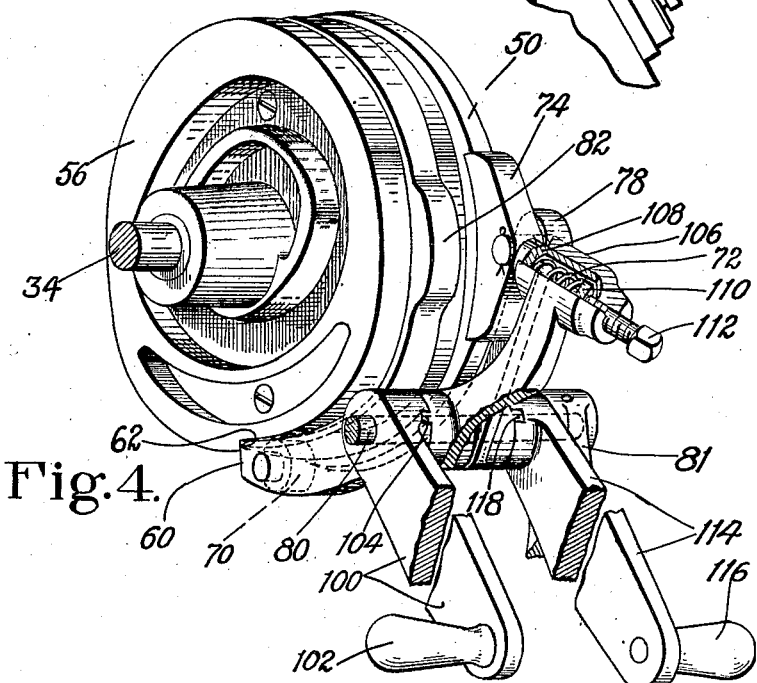

Patented Nov. 19, 1929

1,735,898

UNITED STATES PATENT OFFICE

FREDERICK M. FURBER, DECEASED, LATE OF REVERE, MASSACHUSETTS, BY SAMUEL R. CUTLER, ADMINISTRATOR, OF REVERE, MASSACHUSETTS, ASSIGNOR TO UNITED SHOE MACHINERY CORPORATION, OF PATERSON, NEW JERSEY, A CORPORATION OF NEW JERSEY

DRIVING AND CONTROLLING MECHANISM

Application filed August 16, 1926. Serial No. 129,468.

This invention relates to driving and controlling mechanisms for power driven machines and is herein shown, for illustrative purposes, as arranged for embodiment in a machine for placing and securing heel pads inside of the heel ends of completed shoes so that the pads will protect the heels of the wearers from any nails or tacks which may project into the inside of the shoes. Such a machine is illustrated and described in United States Letters Patent No. 1,604,161, granted October 26, 1926, on application of Frederick M. Furber, of which application this application is a continuation in part. The illustrated mechanism is not, however, limited to use in machines of this particular type.

In machines of the type referred to, as in many machines, some of the parts are relatively delicate so that they are liable to be broken if the machine continues to operate when the work is displaced in the machine or the parts become disarranged from any cause. It is, therefore, desirable to provide means for stopping the machine under such conditions before injury to the parts, to the work, or to the operator can occur.

In such machines, too, a relatively large amount of power is necessary for performing some operations although other operations performed by the machine at different points in the cycle involve delicate mechanism such as that referred to above and requires less power. It is, therefore, desirable not only to provide means for stopping the machine as above stated but also to provide against excess power when less than maximum power is required, while insuring that sufficient power will be applied to the machine when necessary for performing those functions requiring more power.

In view of the foregoing, it is an object of the invention to provide a driving and controlling mechanism adapted for use in connection with machines of the type disclosed in the co-pending application referred to, which will satisfy the requirements pointed out above.

With the above object in mind, a feature of the invention consists in a novel driving and controlling mechanism comprising a friction drive which will slip whenever the machine is overloaded, due either to displacement of the work in the machine, to disarrangement of the parts of the machine or to any other cause, and, by such slipping, act to stop the machine and prevent the force, which is then being applied to and by the parts of the machine, from increasing to a point that might injure the work or the machine itself. The friction of the friction drive is preferably made adjustable so that the force that is applied to the machine may be made only sufficient to cause the machine to operate properly while still permitting the slipping referred to, if the conditions mentioned arise.

Another feature of the invention consists in providing means to prevent the friction device from slipping at those points in the cycle of operations where maximum power is required while permitting slippage at those points where less than the maximum power is required.

In order that the driving mechanism may be best adapted to satisfy widely varying requirements and in accordance with another feature of the invention, the illustrated mechanism comprises, in addition to means for automatically controlling the power variation as above stated, means enabling the operator to have under his control, whenever desirable, the amount of power that will be supplied to the mechanism for operating on the work at different portions of the cycle. Preferably and as illustrated, the variation in power, whether effected automatically or under the control of the operator, is independent of and does not affect the speed of the machine.

The features of the invention outlined above, as well as the further features hereinafter described and referred to in the claims, will be understood from an inspection of the accompanying drawings and the following detailed description of the mechanism illustrated therein.

In the drawings:

Fig. 1 is a side elevation of the driving and controlling mechanism arranged for treadle operation, with certain parts shown in section;

Fig. 2 is a front elevation in section;

Fig. 3 is a perspective view, partly in section;

Fig. 4 is a perspective view showing the driving and controlling mechanism arranged for hand operation and provided with mechanism to give the operator hand control of the power being transmitted and adapted to be used as an emergency brake when necessary; and Fig. 5 is a view similar to Fig. 1 but showing the embodiment of the invention illustrated in Fig. 4.

The driving and controlling mechanism of the present invention is arranged for use in a machine of the type illustrated and described in the co-pending application referred to above. The supporting column of such a machine is shown at 20. Upon this column is mounted a frame 22 for supporting both the driving and controlling mechanism and the operating parts of the machine.

On a bracket 24, extending rearwardly from the column, is mounted an electric motor 26 which is controlled by a switch 28 mounted on the front of the column. When the switch 28 is closed, the motor 26, by means of a belt 30, drives a large grooved pulley 32 which is fast on, and drives a shaft 34. This shaft has pinned to it a pinion gear 36 which meshes, at diametrically opposite points, with spur gears 38 and 40 which are keyed to pinions 42 and 44 respectively. The gear 38 and pinion 42 are mounted to turn upon a short shaft 46 and the gear 40 and the pinion 44 are similarly mounted to turn upon a short shaft 48. These shafts are secured by means of nuts, at diametrically opposite points on a spider or clutch disk 50 which is mounted to turn loosely about the shaft 34, by means of a bushing 52. The pinions 42 and 44 mesh with an internal gear 54 secured to a cam disk 56 which is mounted to turn loosely about the shaft 34 by means of a bushing 58 and which is provided with various cam surfaces effective to control the operation of various mechanisms of the machine. Although this part will be referred to hereinafter as a "cam" disk, especially as it has embodied in it a cam for controlling the present driving mechanism, it should be understood, however, that this term is meant to include any member corresponding to the part 56 through which the operating mechanism of a machine can be driven.

The operation of the previously described gears comprising the pinion 36, the intermeshing spur gears 38, 40, pinions 42, 44, and internal gear 54, which together form a planetary gearing system, will now be described.

When the current has been turned on at 28, the shaft 34 rotates constantly, thereby rotating, through the pinion gear 36, the planetary gears mounted on the shafts 46 and 48. If the cam disk 56 is now sufficiently restrained and maintained stationary, due to the usual load thereon or by a suitable stopping device, the pinions 42 and 44 of these planetary gears will ride on the internal gear 54 on the cam disks 56 but, as this internal gear cannot move, the shafts upon which the planetary gears are mounted will travel in the same direction as the pinion 36, thus rotating the clutch disk, on which these shafts are mounted, in the same direction as the shaft 34 but at reduced speed. On the other hand, if the clutch disk 50 is sufficiently restrained and maintained stationary, the shafts 46 and 48 will likewise be stationary and the planetary gears on them will be revolved by the pinion 36, thereby driving the internal gear 54 and the cam disk 56, with its load, at reduced speed but in the opposite direction from the direction of rotation of the shaft 34. Thus, if either of the two disks 50 or 56 is restrained to a greater extent than the other, it will remain stationary while the other disk will be compelled to rotate at a reduced speed by the gearing system just described.

By using suitable gears in designing a planetary gearing system for this mechanism, any desired speed reduction may be obtained or the cam disk 56 may be given a speed equal to or even higher than that of the driving shaft 34, as will be readily understood by those skilled in the art.

In order to keep the machine or mechanism which may be driven from this cam disk 56 in normal stopped position, this disk must, of course, be maintained in stationary position and it can be permitted to rotate only when it is desired that the mechanism driven from the disk shall operate, at which time the disk is released by the operator.

In order to keep the cam disk normally in stopped position, a pivoted, curved lever 60 is provided and is arranged to have its lower end engage a notch 62 in the circumference of the cam disk 56. When it is desired to drive the machine connected thereto, by causing the cam disk 56 to rotate, this lever is withdrawn from the notch and at the same time means is provided to stop the clutch disk 50 (which has been revolving while the cam disk 56 has been stopped) as will be described.

In the construction shown in Fig. 1 the lever 60 is connected, by means of a treadle rod 64, with a treadle 66 which is normally maintained in a raised position by a spring 68. When the treadle is depressed, the lower end of the lever 60 is withdrawn from the notch 62 and the cam disk 56 starts to revolve because, at the same time, the clutch disk 50 is stopped from revolving by the action of the upper end of the lever 60, in a manner which will later be described. When the treadle is released, a roller 70, secured to the lower portion of the lever 60, rides upon the cam disk 56 and finally arrives at a depression in the surface which allows the lower end of the lever 60 to come into position to engage the notch 62 and stop the cam disk 56, while the clutch disk 50 is permitted to start revolving by the action of the upper end of the lever 60, as will be explained.

At the time that the lower end of lever 60 is withdrawn from the notch 62, its upper end compresses a spring 72 which forces a brake shoe 74 against the clutch disk 50 so that it will no longer revolve and so that the motion of the shaft will then be transmitted by the planetary gears to cause the cam disk 56 to revolve as above described. The brake shoe 74 is pivotally mounted at 76 upon a substantially vertical lever 78 which is mounted on a shaft 80 upon which the lever 60 is also mounted. The shaft 80 is fixedly supported at its ends in brackets 81.

The brake 74 is released from the clutch disk 50 when the roll 70 reaches the previously-mentioned depression in its guiding cam surface so that the spring 68, through the treadle 66 and the treadle rod 64, forces the lever 60 into stopping position against the notch 62. Thus, as the cam disk 56 stops, the clutch disk 50 starts to move because, as before explained, if one of these disks is held sufficiently, the other is always driven. It will be seen that if the treadle is released soon after the mechanism is started, the mechanism will stop after one revolution has been made, although, if the treadle is maintained in depressed position, the mechanism and the machine driven thereby will continue to operate until after the treadle is released.

In order to keep the operation of the mechanism clearly in mind, it should be noted that the effect of the brake 74 is unusual in that it is applied to start the mechanism controlled by the cam disk 56 and is released to stop that mechanism.

In the machine disclosed in the above referred to application, like many other machines, there are times in its cycle of operations when delicate mechanisms are brought into play which would be injured if the machine should continue to operate after they become displaced or jammed. The illustrated mechanism is arranged to prevent such injury should any jamming occur. This is accomplished by having a comparatively light, suitably adjusted pressure on the spring 72 so that, if the mechanisms operated by the cam disk 56 meet any increased resistance, the cam disk 56 will stop and the clutch disk 50 will slip under the light spring pressure of the spring 72 upon the brake shoe 74.

There are other times in the cycle of operations of the machine when much more power is required of the cam disk 56 than that used by the delicate mechanisms. Accordingly a projection 82 is provided on the cam disk 56 to be engaged by the roll 70. When this engagement takes place, the lower end of the lever 60 is moved downward to a greater extent and its upper end compresses the spring 72 with more force so that the brake shoe 74 than engages the clutch disk 50 with sufficient force to prevent slippage between these parts and insure that the necessary power is applied to the cam disk 56.

It is obvious from the above that still other variations in the amounts of power transmitted to the machine at different times in the cycle of operations may be provided by additional projections of suitable height in the cam disk 56 or the cam may be otherwise so shaped that the lever 60 will be moved and the brake shoe 74 be applied to the clutch disk 50 with varying force.

It should be noted that, notwithstanding the varying force that may be applied to the brake shoe 74, the clutch disk 50 remains stationary as long as the cam disk 56 is not overloaded sufficiently to cause slippage between the brake shoe 74 and clutch disk 50. Thus, while varying amounts of power may be supplied to the cam disk 56 to meet the load requirements at different points in the cycle of the mechanism driven from the cam disk, no change takes place in the relative motion of the parts so that no change occurs in the speed of the cam disk or of the mechanisms driven thereby, whatever may be the amount of power (within the limits of safety) that is transmitted thereto.

In the embodiment of the invention shown in Figs. 4 and 5, the lever 60 is arranged to be controlled by a hand lever 100, mounted on the shaft 80, and provided with a handle 102. The connection between the hand lever 100 and the lever 60 is obtained by means of a tongue-and-groove connection 104 between their hubs. The upper end of the lever 60, as modified, is provided with a housing 106 for a spring plunger 108 which is operated by a spring 72 located within the bore of the plunger. Also located in the housing 106 is a cap 110 bearing on the spring 72. An adjusting screw 112 is tapped into the end of the housing 106 and bears on the cap 110 whereby the pressure on the spring 72 may be adjusted. The plunger 108 bears against the brake shoe 74 in the same manner as the spring does in the construction shown in Fig. 1. However, in the modified form, the brake lever 78 is connected with an independent, hand-controlled lever 114, also mounted on the shaft 80, and provided with an operating handle 116, the connection between this lever and the brake lever being by means of a tongue and groove joint 118 between their hubs. The hand lever 114 is shown in Fig. 4.

When the hand lever 100 is raised, the control lever 60 is operated to start the cam disk 56 in the same manner as when the treadle is depressed in the construction of Fig. 1 and the weight of the lever operates to bring the mechanism to stopping position in the same manner as the spring 68 in the construction of Fig. 1.

The adjusting screw 112 provides an easy and accurate means for adjusting the pressure on the brake shoe 74, whereby the load at which the brake will slip and cause the cam disk 56 to stop when it is overloaded, may be predetermined with exactness. Under conditions where it is desirable for the operator to have control over the power applied to the cam disk 56 the adjusting screw 112 may be set to give the minimum pressure required and additional pressure for transmitting more power to the cam disk 56 is easily applied by the operator lifting on the hand lever 114 in accordance with his judgment and experiences as to the amount of power required at various points in the cycle of the machine driven by the cam disk 56.

When an emergency arises so that it is desirable to stop the cam disk 56 and the machine driven thereby, this may be accomplished by depressing the lever 114, thereby moving the brake shoe 74 away from the clutch disk 50, against the force of the spring 72. This will, of course, permit the clutch disk 50 to start rotating and will cause the load on the cam disk 56 to stop it.

Having thus described the invention, what is claimed as new and is desired to be secured by Letters Patent of the United States is:

1. In a driving and controlling mechanism for a machine having a part movable to operate a work treating instrumentality, the combination of mechanism including a friction device for moving said part, and means for varying the friction in said friction device during a portion of the period of operation.

2. In a driving and controlling mechanism for a machine having a part movable to operate a work treating instrumentality in a definite cycle, the combination of power driven means, a connection between said means and said part comprising a friction device, and means for varying the friction in said device during the cycle of operations.

3. In a driving and controlling mechanism for a machine having a part movable to operate a work treating instrumentality, in a definite cycle and requiring different amounts of power at different points in the cycle, the combination of friction means through which power is transmitted to said part, and means for varying the friction in the friction means, thereby to transmit varying amounts of power as required for the operation of the machine.

4. In a driving and controlling mechanism for a machine having a part movable to operate a work treating instrumentality in a definite cycle and requiring a definite amount of power at a definite point in the cycle, the combination of friction means through which the power is transmitted to said part, and means for adjusting the friction at said point in the cycle so that the friction will slip and stop the machine if the machine is overloaded at such point in the cycle.

5. In a driving and controlling mechanism for a machine having a part movable to operate a work treating instrumentality in a definite cycle and requiring a maximum amount of power at a definite point in the cycle, the combination of friction means through which the power is transmitted to said part, and means for adjusting the friction at a sufficient maximum at said point in the cycle so that the friction will not slip but will be sufficient to drive the machine at such point in the cycle.

6. In a driving and controlling mechanism for a machine having a part movable to operate a work treating instrumentality in a definite cycle and requiring different amounts of power at different points in the cycle, the combination of friction means through which power is transmitted to said part, means for increasing the friction in the friction means up to a maximum when maximum power is required by the machine, and means for decreasing the friction at another point in the cycle to such an extent that the friction will slip and stop the machine if the machine is overloaded at such point in the cycle.

7. In a driving and controlling mechanism for a machine having a part movable to operate a work treating instrumentality, the combination of driving means comprising a friction device, a lever constructed and arranged to apply pressure to said friction device, and a device bearing against said lever with varying force, thereby to vary the friction in said friction device.

8. In a driving and controlling mechanism for a machine having a part movable to operate a work treating instrumentality, the combination of driving means, a driven member connected to supply power to said part, a load on said part tending to restrain said driven member, a second driven member, and means for restraining, with varying force, the second driven member from being driven, all so constructed and arranged that when either driven member is restrained to a greater extent than the other, that one which is least restrained will be driven, and whereby the power supplied to said part, when the second driven member is restrained, will vary in accordance with the restraining force applied to said second member.

9. In a driving and controlling mechanism for a machine having a part movable to operate a work treating instrumentality, the combination of a shaft arranged to be rotated by application of power, two disk members rotatably mounted thereon, and so constructed and arranged that when one disk member is sufficiently restrained from movement the other is caused to be rotated by the shaft, connections between one of said disk members and the movable part, a brake arranged to restrain the other of said members, means for pressing said brake thereagainst, and means for varying the pressure on said brake at a desired point.

10. In a driving and controlling mechanism for a machine having a part movable to operate a work treating instrumentality, the combination of a shaft arranged to be rotated by application of power, two disk members rotatably mounted thereon and so constructed and arranged that when one disk member is sufficiently restrained from movement the other is caused to be rotated by the shaft, connections between one of said disk members and the movable part, a brake arranged to restrain the other of said members, a lever for pressing said brake thereagainst and arranged to be actuated by the first-named disk member, and a cam on said first named member for momentarily varying the pressure on said brake.

11. In a driving and controlling mechanism for a machine having a part movable to operate a work treating instrumentality, the combination of a rotatable shaft, two disks mounted thereon and rotatable independently thereof, a connection between said disks constructed and arranged so that when either disk is restrained to a greater extent than the other, the disk which is least restrained will be rotated through said connection by said shaft, a cam surface and an abutment on one of said disks, a pivoted lever arranged to have one end controlled by said cam surface and arranged to lock with said abutment, and a brake controlled by the other end of said lever and arranged to restrain the other of said disks, thereby to cause a revolution through a desired angle of said cam-surface disk after the lever is unlocked.

12. In a driving and controlling mechanism, the combination of a rotatable shaft, two disks mounted thereon and rotatable independently thereof, a connection between said disks constructed and arranged so that when either disk is restrained to a greater extent than the other, the disk which is least restrained will be rotated through said connection by said shaft, a cam on one of said disks, an abutment on the same disk, a pivoted cam lever, a roll on said lever arranged to be guided by said cam, a depression in said cam arranged to permit one end of the cam lever to lock with said abutment, and a brake controlled by the other end of said lever and arranged to restrain the other of said disks, thereby to cause a revolution through a desired angle of said cam after the lever is unlocked.

13. In a driving and controlling mechanism, the combination of a rotatable shaft, two disks mounted thereon and rotatable independently thereof, a connection between said disks constructed and arranged so that when either disk is restrained to a greater extent than the other, the disk which is least restrained will be rotated through said connection by said shaft, one of said disks being arranged to deliver power to operate a machine, a brake arranged to restrain at will the other of said disks from movement, a spring by which the brake is operated, and means for adjusting the tension on said spring whereby the brake will slip and stop the first-mentioned disk from rotating when a definite overload is placed on said first-mentioned disk.

14. In a driving and controlling mechanism, the combination of a rotatable shaft, two disks mounted thereon and rotatable independently thereof, a connection between said disks constructed and arranged so that when either disk is restrained to a greater extent than the other, the disk which is least restrained will be rotated through said connection by said shaft, one of said disks being arranged to deliver power to operate a machine, a brake arranged to restrain at will the other of said disks from movement so that said machine may be driven, and a manual control member for said brake which, when operated in one direction, will cause the apparatus to be driven and which, when operated in the other direction, will act as an emergency stop for said machine.

15. In a driving and controlling mechanism for a machine having a part movable to operate a work-treating instrumentality in a definite cycle and requiring different amounts of power at different points in the cycle, the combination of friction means through which power is transmitted to said part, means driven by said part for varying the friction in the friction means, thereby to transmit varying amounts of power as required for the operation of the machine, and means under the control of the operator for modifying the action of said friction varying means during the operation of the machine.

16. In a driving and controlling mechanism for a machine having a part movable to operate a work-treating instrumentality in a definite cycle and at a definite speed and requiring different amounts of power at different points in the cycle, the combination of friction means through which power is transmitted to said part, automatic means for varying the friction in the friction means, thereby to transmit, at said definite speed, varying amounts of power as required for the operation of the machine, and means under the control of the operator for modifying the action of said friction varying means during the operation of the machine.

In testimony whereof I have signed my name to this specification.

SAMUEL R. CUTLER,
*Administrator of the Estate of Frederick M. Furber.*